2,751,576

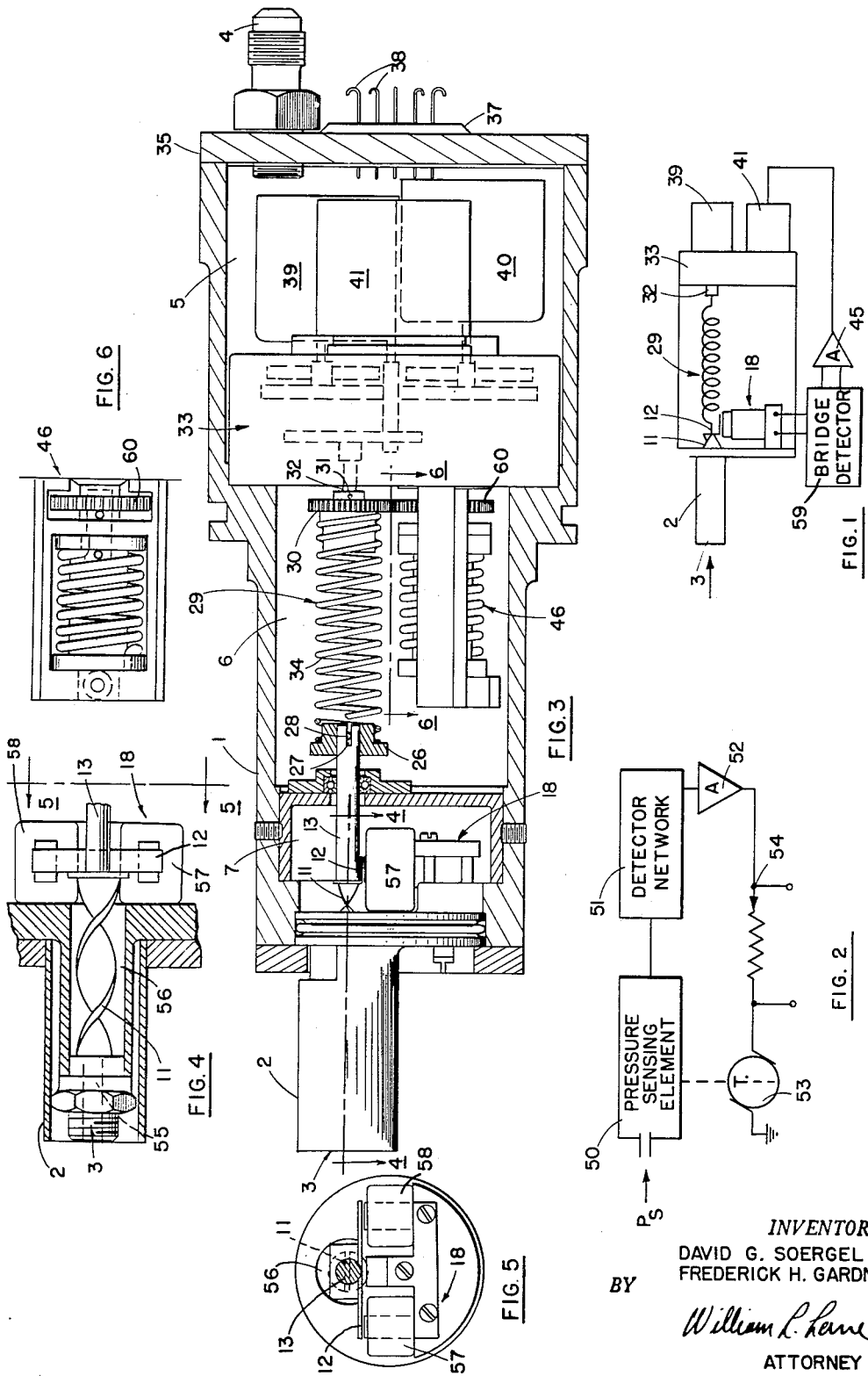
June 19, 1956 — D. G. SOERGEL ET AL — 2,751,576
CLOSED-CYCLE PRESSURE TRANSDUCER
Filed Jan. 14, 1952
INVENTORS
DAVID G. SOERGEL
FREDERICK H. GARDNER
BY William P. Lane
ATTORNEY

United States Patent Office 2,751,576
Patented June 19, 1956

CLOSED-CYCLE PRESSURE TRANSDUCER

David G. Soergel and Frederick H. Gardner, Long Beach, Calif., assignors to North American Aviation, Inc.

Application January 14, 1952, Serial No. 266,374

12 Claims. (Cl. 340—187)

This invention relates to a transducer, and particularly to a closed-cycle pressure transducer.

A transducer is a device by means of which energy from one power system is transmitted to another system whether of the same or different type. A typical pressure transducer would be one which translates a pressure variation into a variation of current, voltage, resistance, or inductance.

In the past, pressure transducers have usually been of the open-cycle variety. An open-cycle transducer operates on a displacement versus pressure characteristic, that is, a change in the pressure applied causing a motion or displacement of a pressure sensitive element. This displacement is translated into a variation of current, voltage, resistance, or inductance which may be useful as an input to some control apparatus.

In order to translate the displacement of the pressure sensitive element into the desired variation, some additional load must usually be placed on the pressure element. Some resistive forces tending to oppose motion or return the element to its original shape must be overcome. This force may be friction force of some mechanical means such as a linkage potentiometer wiper or spring, or it may be exerted by electrical or magnetic means, such as an inductive pick-off. By whatever means, the resistive forces may distort the pure displacement versus pressure characteristic of the pressure sensitive element, since the pressure sensitive element will operate against some combination of displacement ond force.

When displacement of the pressure sensitive element is used to produce the output, there is an additional error due to hysteresis. Because of hysteresis, the output of the transducer has a different value for any given pressure input depending on whether the pressure is increasing or decreasing and the amplitude of previous increase and decrease.

An additional disadvantage of open-cycle pressure transducers is the cumulative effect of errors due to a change in the ambient temperature. An error due to variation in temperature in any element from the pressure input to the output is additive to produce the total error due to changes in the ambient temperature.

This invention contemplates a closed-cycle pressure transducer which eliminates or reduces to practicality such disadvantages. This closed-cycle transducer operates on a normal force balance principle. This means that the output of the transducer is no longer dependent on the amount of displacement of the pressure sensitive element, but depends on a balancing of two forces to maintain the element in its balanced or zero position. One of these forces is produced in the pressure sensitive element by the input pressure. The other force is produced by a system of feedback from the output.

A null detector, which might be of the variable capacitor or inductive "E" pick-off type, is employed to detect any departure of the pressure sensitive element from its normal balanced position. When the element is unbalanced, a signal is sent from the null detector network to an amplifier circuit which actuates a torquing device, such as an electromagnetic torquer or motor. The torquing device moves, due to the amplifier output current, as long as the null detector indicates an unbalanced condition. Part of the output of the torquing device is fed back to the pressure sensitive element as a correcting factor. When the feedback is sufficient to restore the force balance, the torquing device ceases to move. The desired variation of the current, voltage, resistance or inductance output is obtained from the output of the torquing device, or it may be obtained from the output of the amplifier circuit, since the amplifier output current must be sufficient to maintain the required torque in the electromagnetic torquing device or motor.

It is, therefore, an object of this invention to translate energy from one system to another using a closed-cycle transducer.

It is another object of this invention to translate energy using a force balance device.

It is another object of this invention to produce output variation proportional to a pressure change with a minimum load on the pressure sensitive element.

It is a further object of this invention to produce a pressure transducer which reduces to a practical minimum errors due to changes in ambient temperature.

It is a further object of this invention to produce a pressure transducer which eliminates, to a great extent, the difficulties of calibration of the pressure sensitive device.

Other objects of invention will become apparent from the following description taken in connection with the accompanying drawings, in which Fig. 1 is a schematic drawing of one form of the preferred arrangement of this invention where the desired output is a shaft rotation proportional to input pressure;

Fig. 2 is a schematic drawing of another arrangement of this invention where the desired output is a variation of current or voltage proportional to input pressure;

Fig. 3 is a cross-section side view of the device used in Fig. 1;

Fig. 4 is a sectioned view of the pressure sensitive element taken along the line 4—4 of Fig. 3;

Fig. 5 is a view partly in section of the null detector taken along the line 5—5 of Fig. 4; and Fig. 6 is a view of the spring stop device taken along the line 6—6 of Fig. 3.

Referring to Fig. 1 and to the sectioned view shown in Fig. 3, the desired output is a variation of resistance in potentiometers 39 and 40 which is proportional to the difference in the pressures supplied at fittings 3 and 4. Casing 1, Bourdon tube assembly 2, and plate assembly 35 enclose a pressure-sealed chamber consisting of interconnected chambers 5, 6, and 7. All external electrical connections to the transducer are made through terminals 38 of pressure-sealed socket 37. Fitting 4 is provided in plate assembly 35 to provide a port whereby any desired pressure is impressed in chambers 5, 6, and 7, and hence one side of Bourdon tube 11. Fitting 3 is provided in Bourdon tube assembly 2 to provide means for exerting input pressure to the other side of the Bourdon tube 11 or to evacuate that side if a static pressure input is desired.

Referring to Fig. 4 Bourdon tube assembly 2 is shown in detail. The pressure at fitting 3 is applied through duct 55 to the interior surfaces of torsional straight line Bourdon tube 11. The pressure at fitting 4 is applied to the outer surfaces of Bourdon tube 11 by means of chamber 56 which is interconnected to chambers 5, 6, and 7. The rotatable end of Bourdon tube 11 normally has an angular displacement proportional to the difference between the pressures on the inner and outer surfaces of tube 11. However, a closed servo loop, described later, prevents any angular rotation of this free end of Bourdon tube 11. Therefore, instead of having an angular displacement output at its free end, Bourdon tube 11 produces a torsional force which is proportional to the pressure differential and which is unaffected by any accelerations along the axis of the tube or perpendicular to that axis.

Torsional straight line Bourdon tube 11 is sensitive to changes in the pressure differential between fittings 3 and 4. The movable or torque end of Bourdon tube 11 is rigidly connected to armature 12 of null detector 18. The physical relationship between armature 12 and detector 18 is shown in Fig. 5. Rotation of armature 12 by Bourdon tube 11 produces a change in the relative inductance of coils 57 and 58. Feedback shaft 13 is also attached to armature 12. Torsional spring assembly 29, consisting of straight-line torsional spring 34 secured to spring collars 26 and 30, transmits torque to feedback shaft 13 by means of shaft slot 27 and pin 28. Slot 27 permits axial motion of the torsional devices while transmitting all torque.

Normally the torque of torsional spring 29 is equal and opposed to the torque of Bourdon tube 11, and armature 12 is in a balanced or zero position. A change in the pressure differential upsets this balanced torque position. The unbalanced torque causes balanced armature 12 to rotate about the center line of Bourdon tube 11. Rotation of armature 12 unbalances the null detector 18. Null detector 18 is an inductive "E" pick-off type consisting of a stator and armature 12. When unbalanced, the null detector 18 unbalances bridge detector 59 which is of conventional design, having inductance coils 57 and 58 in two of its arms. Bridge 59 sends an error signal to power amplifier 45. In response to the error signal, power amplifier 45 furnishes power to motor 41. The direction of rotation of motor 41 depends on the phase of the detector error signal.

Motor 41 drives gear train 33. Output shafts of gear train 33 are connected to drive potentiometers 39 and 40. A further output shaft of gear train 33 is feedback drive shaft 32. Torsional spring collar 30 is secured to feedback drive shaft 32 by taper pin 31. Feedback drive shaft 32 is driven in such a direction as to cause torsional spring 34 to exert a torque on balanced armature 12, tending to return armature 12 to its zero balanced position.

As the forces tend toward balance, the detector 59 output voltage decreases until a state of equilibrium is established wherein the residual voltage output of the detector is just sufficient to maintain the required amplifier 45 current which produces the balancing torque required to maintain the state of equilibrium. Motor 41 ceases to run. The output shafts of potentiometers 39 and 40 being geared to motor 41 have turned through an angle which is proportional to the change pressure. Detail 46 is a spring stop device to prevent damage to the follow-up spring 34. Fig. 6 is a detailed view of the spring stop device.

The device used in the example described above for obtaining shaft rotation proportional to pressure operates on the principle of maintaining zero deflection of the movable end of Bourdon tube 11. Only a small amount of deflection starts the feedback torque canceling out the deflection. Thus the amplitude of deflections is kept very small. Since the magnitude of the hysteresis error of the device depends on the amplitude of deflections from zero position, the hysteresis error is negligible.

In order to eliminate, to a practical degree, errors due to a change in the ambient temperature, torsional spring 29 and Bourdon tube 11 are both fabricated from the same material, preferably one with a constant modulus, such as ni-span "C."

Since the device works on a torque versus torque principle with zero work being done when the torques are balanced, the pressure sensitive element is not required to do any additional work and hence is unloaded.

Referring to Fig. 2, a modification of the above-described invention is shown. In this scheme, where a variation of current or voltage output proportional to input pressure is desired, the input pressure, $P_s$, causes deflection of the armature of pressure sensitive device 50. A detector network 51 detects the deflection from zero position of the armature and sends a polarized signal to power amplifier 52. The output of power amplifier 52 supplies power to torquing device 53. Torquing device 53 exerts a counter torque on the armature of pressure sensitive device 50. The amount of this counter torque depends on the amplitude of the error signal sent out by detector network 51.

Since torquing device 53 tends to restore the armature to its original zero position, the error signal is correspondingly decreased. A balance condition is reached where the armature is deflected a small amount to create the necessary error signal, but most of the torque created by the pressure, $P_s$, is opposed by torquing device 53. The amount of torque output of torquing device 53 is proportional to the pressure input, $P_s$. Since the current necessary to produce this torque is proportional to the torque, the desired variation of current or voltage may be taken from the output of power amplifier 52 as indicated by load 54.

By this arrangement the deflection of the pressure sensitive element is reduced to a very small amount. Since the amplitude of deflection is never very large, hysteresis error is held to a practical minimum. The increasing work load on the pressure sensitive element is made negligibly small, since the deflection is held small. A method of coupling the torquining device to the pressure sensitive element similar to that shown in Fig. 3 reduces any errors due to change in ambient temperature.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A transducer comprising a torsional pressure sensitive element subject to fluid pressures, an armature rotatably associated with said element, a torquing device rotatably associated with said armature, and means responsive to an angular displacement of said armature to actuate said torquing device to continuously return said armature to its former angular position.

2. A transducer comprising a rotatably balanced armature, means responsive to fluid pressure for rotationally displacing said armature, detector means sensitive to the angular displacement of said armature, amplifier means controlled by the output of said detector means, a torquing device powered by said amplifier means, means responsive to said torquing device for continuously repositioning said armature in its rotatably balanced position, and means for obtaining an output proportional to the output of said torquing device, whereby said output is proportional to said fluid pressure.

3. A transducer for producing an output displacement proportional to fluid pressure change comprising a normally rotatably balanced armature, a torsional device responsive to said fluid pressure change to rotatably displace said armature, null detector means sensitive to said displaced condition of said armature, an amplifier controlled by the error signal output of said detector means, a motor actuated by said amplifier, output displacement means operatively associated with said motor, and torsional spring means actuated by said motor for returning said armature to its rotatably balanced condition whereby said torsional device is relieved of any work toward maintaining said output displacement.

4. A closed-cycle pressure tansducer for producing an output displacement proportional to fluid pressure changes comprising a normally rotatably balanced armature, a torsional Bourdon tube responsive to said fluid pressure changes to rotatably displace said armature, inductive "E" pick-off means sensitive to said armature angular displacement, an amplifier connected to amplify the output of said pick-off means, a motor actuated by the output of said amplifier, at least one output shaft geared to the output of said motor, a feedback shaft geared to the output of said motor, and torsional spring means one end of which is rotatably associated with said feedback shaft, the other end of which is rotatably associated with said torsional Bourdon tube whereby said tube is always returned to a zero angular displaced position.

5. A device as described by claim 4 wherein said Bourdon tube and said torsional spring are manufactured from the same material, whereby changes in ambient temperature are automatically compensated for.

6. A closed-cycle pressure transducer for converting pressure changes into shaft rotation comprising a torsional straight line Bourdon tube having a fixed end and a torque end responsive to said pressure changes, an inductive "E" pick-off detector having an armature and a stator with said armature rigidly attached to the torque end of said Bourdon tube and said stator positioned to detect angular displacement of said armature, a straight line torsional spring composed of the same material as said Bourdon tube, a feedback shaft one end of which is rigidly attached to said detector armature, the other end of which is rotationally associated with one end of said torsional spring, a motor, a gear train driven by output of said motor with at least one output shaft and a feedback drive shaft, a collar rigidly attached to the second end of said torsional spring and attached to said feedback drive shaft, and a power amplifier responsive to an unbalance signal from said detector to drive said motor.

7. A closed-cycle pressure transducer comprising a torsional pressure sensitive element having two pressure surfaces, port means exposing one surface of said pressure element to fluid pressure, port means exposing the other surface of said pressure element to a second fluid pressure, a torsional spring composed of the same material as said pressure sensitive element and attached to said element with its torque opposing the torque of said element, an armature positioned to rotate in response to the torques of both said torsional spring and said pressure element, inductive "E" pick-off detector network sensitive to rotational movement of said armature, an amplifier amplifying the output of said detector network, a motor energized by said amplifier, gear means connecting the output of said motor to said torsional spring for returning said armature to a rotationally balanced position, and at least one output shaft operatively associated with the output of said motor.

8. A pressure sensitive device for obtaining an output displacement proportional to fluid pressure comprising a torsional Bourdon tube having a fixed and a torque end responsive to said fluid pressure, an inductive pick-off detector having a stator and an armature with said armature connected to the torque end of said Bourdon tube and said stator positioned to detect angular displacement of said armature, a motor, a gear train geared to the output shaft of said motor, at least one output shaft in said gear train, and a torsional spring, one end of which is rotatably associated with one of said gear train output shafts, the other end of which is rotatably associated with the torque end of said Bourdon tube, whereby said motor is operated to cause said armature to return to a zero angular displaced position after moving due to a fluid pressure change.

9. A device as described in claim 8 wherein said torsional spring and said Bourdon tube are manufactured from the same material whereby changes in ambient temperature are automatically compensated for.

10. A pressure sensitive device comprising a torsional pressure sensitive element having two surfaces, a fixed end and a rotatable end, port means for exposing one surface of said pressure element to fluid pressure, port means for exposing the other surface of said pressure element to a second fluid pressure, a torsional spring composed of the same material as said pressure sensitive element attached to the rotatable end of said pressure sensitive element so that the torque of said torsional spring opposes the torque of said pressure element, a motor, a gear train driven by the output of said motor, an output shaft of said gear train connected to said torsional spring, multiple load output shafts of said gear train, an armature attached to the rotatable end of said pressure sensitive element, and an inductive "E" pick-off detector sensitive to rotational movement of said armature.

11. A closed-cycle transducer for producing a voltage output which is proportional to fluid pressure change comprising a torsional straight line Bourdon tube having a fixed end and a torque end rotationally responsive to said fluid pressure change, an inductive "E" pick-off detector having an armature and a stator with said armature rigidly attached to the torque end of said Bourdon tube and said stator positioned to detect angular displacement of said armature, a straight line torsional spring composed of the same material as said Bourdon tube, a feedback shaft one end of which is rigidly attached to said detector armature, the other end of which is rotationally associated with one end of said torsional spring, a torquer with output shaft rotatably associated with the second end of said torsional spring, an amplifier with input from the output of said detector and with output furnishing power to said torquer, and voltage output means coupled to said amplifier.

12. A transducer for producing an output which is a function of fluid pressure comprising a torsional pressure sensitive device responsive to said fluid pressure, detector means sensitive to rotational movement of said pressure sensitive device, torquer means responsive to said detector means and connected to continuously return said torsional pressure sensitive device to its unrotated position and indicating means responsive to the output torque of said torquing means whereby the output of said indicating means is an accurate measure of said fluid pressure.

References Cited in the file of this patent
UNITED STATES PATENTS

| | | |
|---|---|---|
| 2,264,487 | Smulski | Dec. 2, 1941 |
| 2,293,502 | Hermann | Aug. 18, 1942 |
| 2,511,752 | Tandler et al. | June 13, 1950 |
| 2,563,899 | Wiancko | Aug. 14, 1951 |